Aug. 16, 1949.  C. M. RUTTER  2,479,412
CUTTING AND CLEANING OF STAINLESS STEEL BILLETS
Filed Aug. 17, 1946  2 Sheets-Sheet 1

INVENTOR.
CLYDE M. RUTTER
BY Richey & Watts
ATTORNEYS

Aug. 16, 1949.                    C. M. RUTTER                      2,479,412
              CUTTING AND CLEANING OF STAINLESS STEEL BILLETS
Filed Aug. 17, 1946                                        2 Sheets-Sheet 2
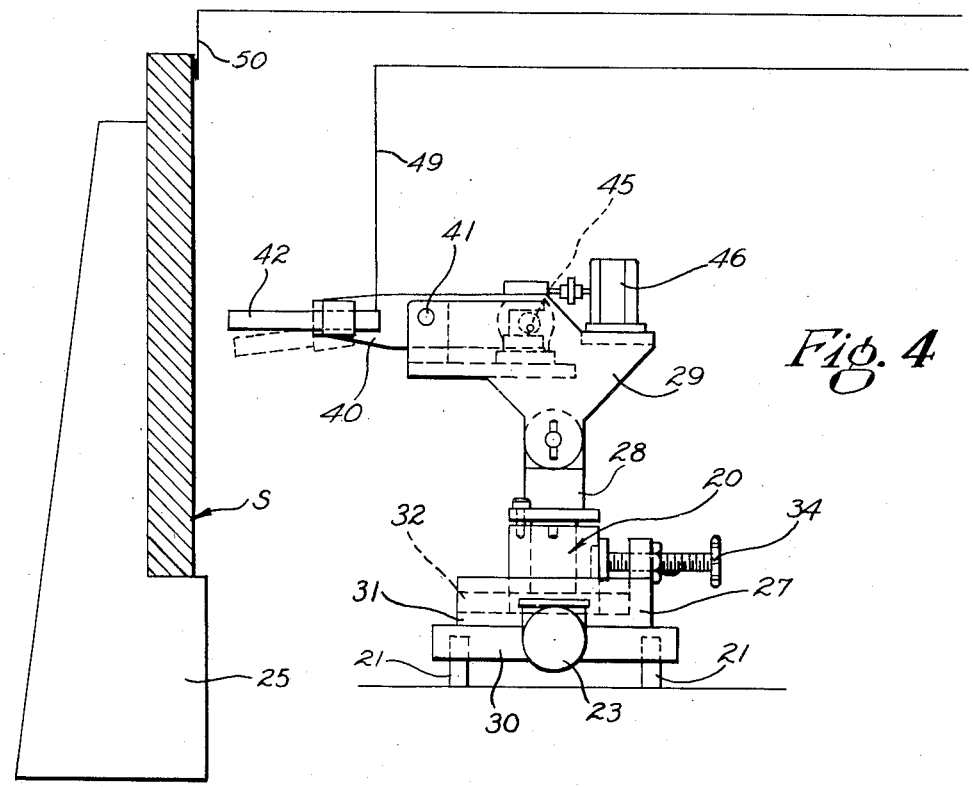
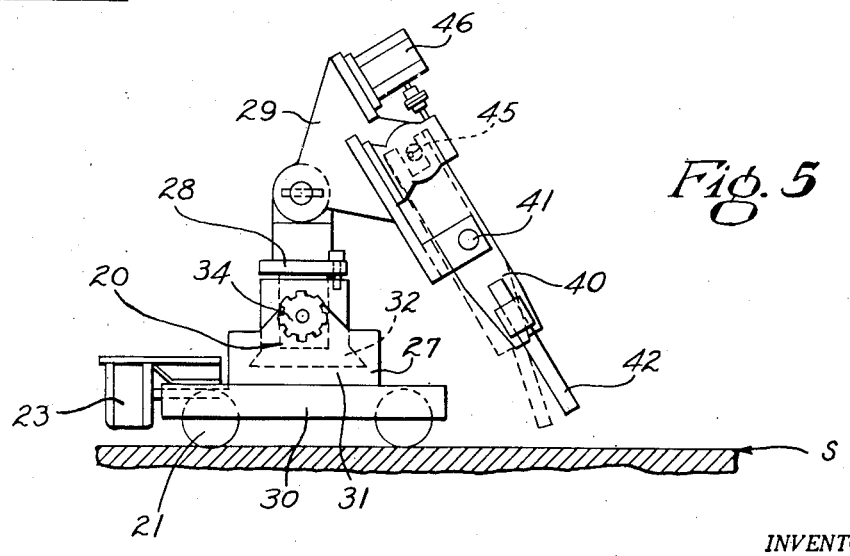
INVENTOR.
CLYDE M. RUTTER
BY Richey & Watts
ATTORNEYS Patented Aug. 16, 1949

2,479,412

UNITED STATES PATENT OFFICE 2,479,412

CUTTING AND CLEANING OF STAINLESS STEEL BILLETS

Clyde M. Rutter, Massillon, Ohio, assignor to Republic Steel Corporation, Cleveland, Ohio, a corporation of New Jersey Application August 17, 1946, Serial No. 691,366

6 Claims. (Cl. 219—14)

1

The present invention relates generally to the art of working and forming metal and is especially concerned with a novel method for cutting or cleaning metal pieces and with means for carrying out said method.

For lack of a suitable method and means for trimming, cleaning and cutting steel, a large tonnage of steel is annually scrapped at a considerable financial loss. There has consequently long been a persistent demand for a method and means which would avoid the necessity of scrapping large quantities of finished or semi-finished steel, particularly stainless steels. To the best of my knowledge, however, this problem has not been heretofore solved. The metal cutting methods employing gas flames, such as the oxy-acetylene flames, have been too expensive to constitute a solution for this problem. Mechanical sawing methods for cutting have likewise always been too expensive.

The present invention is predicated upon my discovery that by means of an electrical arc, steels can be cut or surfaces cleaned in a manner so economical that stainless steel slabs and pieces which would ordinarily be scrapped because of surface imperfections may be salvaged at an expense so small as to make such salvaging highly profitable.

Briefly stated, the method of this invention comprises establishing an electric arc between a suitable electrode and a metal piece to be cut and moving the arc along the course through which the cut is to be made. In a refinement of this process, I maintain the electrode and the arc in constant motion with respect to the surface of the piece, as though mechanically sawing the piece, and thereby effect uniform cutting.

In cutting a metal piece or slab to remove a defective portion or to reduce the size of the piece, I employ a suitable kind of automatic cutting blade or electrode, moving it along the course to be cut as a saw would be moved in making such a cut. In starting the operation, the electrode is placed adjacent to the metal piece, an electric arc is established between the electrode and the piece, and the electrode is moved into the piece as the cutting is accomplished. When the desired cut has been made, the arc is extinguished and the blade is withdrawn from the metal piece. In making a surface cut to remove a defect, I bring the end or point of the electrode close to the metal surface which is to be trimmed, establish an electric arc between the said surface and the electrode point and brush or move the arc over the area of the surface surrounding the defect,

2 until the removal of the defect has been satisfactorily completed.

Ordinarily, the time required to make cuts of either description is very brief and the labor involved in salvaging what would otherwise be scrap material is a small expense item. Furthermore, this method does not demand a high degree of skill on the part of the person manipulating the cutting device and is fully as safe as the ordinary electrical welding practices.

Referring to the drawings accompanying and forming part of this specification:

Figure 4 is an end view of another form of apparatus embodying this invention; and, Figure 5 is a side view of the apparatus of Fig. 4.

Figure 1:
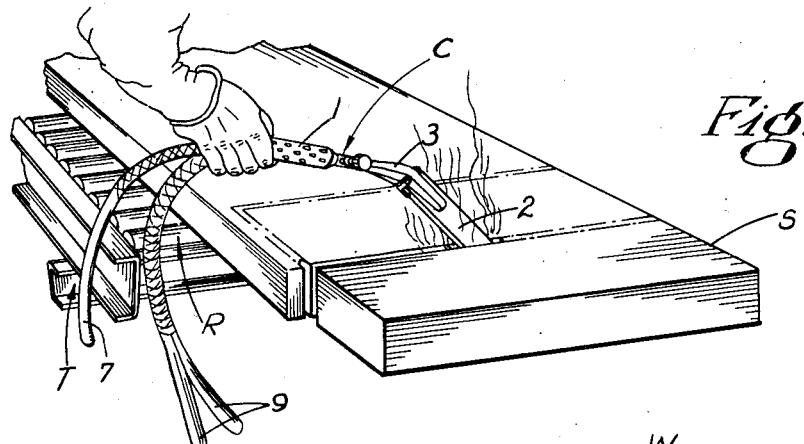
Figure 1 is a perspective view of cutting means embodying this invention in use in cutting a slab of stainless steel.
Figure 2:
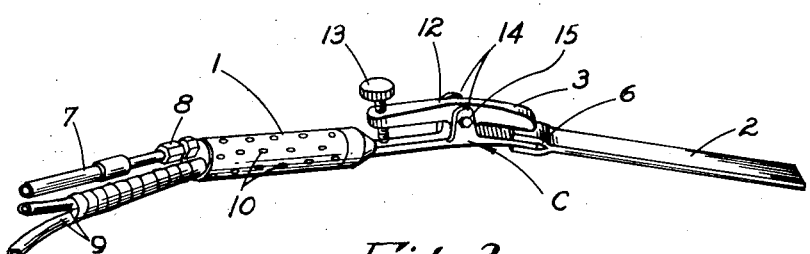
Figure 2 is a perspective view of the cutter of Fig. 1 taken at a different angle.

With reference to Figs. 1 and 2, the cutting means C comprises an air cooled handle 1, a blade-like electrode 2, and a clamp 3 attached to the said handle for gripping and holding the blade against movement with respect to the handle.

The handle 1 is a hollow, cylindrical, metal piece which terminates at one end in a tongue-like, solid portion 6. It is connected to a source of air under pressure (not shown) by line 7 and coupling 8. Electric current conducting wires 9 connecting the electrode to the current source are disposed within the hollow portion of the handle and are suitably electrically connected to the electrode. The handle is provided with vents 10 through which cooling air under pressure may escape from within the handle, and the handle is electrically insulated from the said wires and the electrode 2.

The electrode 2 is an elongated, flat piece, preferably of graphite, which is narrower than the cuts it is intended to make through steel slabs or billets and which is longer than the depth of said cuts. One end of the electrode is slotted or grooved to receive the tongue 6.

The clamp 3 comprises a pivoted metal arm 12 and a threaded bolt 13 which is engaged threadwise with one end of said arm and bears upon the handle 1. The opposite end of the arm engages the electrode, as shown, and in cooperation with tongue 6 of the handle holds said electrode firmly in position with respect to the handle. The clamp is secured to the handle by means of two ear-like projections 14 integrally formed with the handle 1, and a pivot pin 15 which extends through the ears and the mid-portion of the arm 12 of the clamp disposed between said ears.

Figure 3:
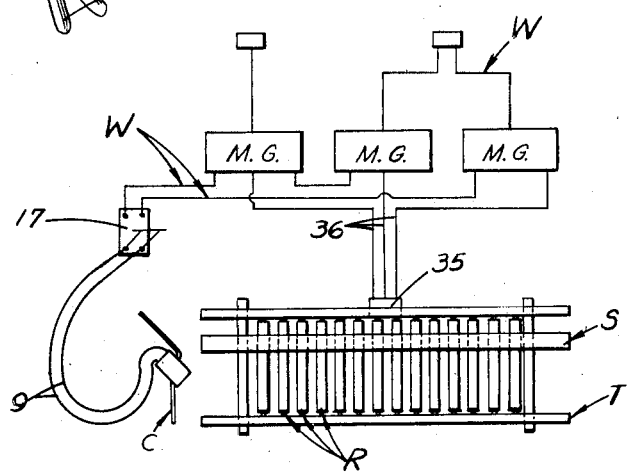
Figure 3 is a diagrammatic view of an assembly embodying this invention showing the electrical circuits of the assembly.

The assembly of Fig. 3 comprises generally a metal table T, a stainles steel slab S disposed upon said table; three conventional motor generators MG, a cutter C and a switch 17.

The rectangular steel frame, which together with suitable supports (not indicated) constitutes the table T, carries ground plate 35. By means of this plate and electrical connections 36 to the motor generators the table is effectively electrically grounded. The table is provided with a plurality of rollers R, also shown in Fig. 1, so that heavy metal slabs may readily be moved across it.

The electrical circuit of this system comprises, in addition to the table and its electrical "ground," wires W connecting the motor generators to a source of direct electric current and connecting the switch 17 to the motor generators MG, and the wires 9 connecting the switch to the electrode cutter 2. The switch may be manual or automatic, depending upon the service required, the equipment available, and the operator's choice.

Referring now to Figs. 4 and 5, the apparatus illustrated comprises a frame 20 having wheels 21, a motor 23 for driving said wheels, a second frame 25 for carrying a steel slab S to be kerfed or scarfed in accordance with this invention.

The frame 20 comprises a horizontally disposed metal base 27, an upright metal body 28 and a head frame 29.

The base 27 comprises a pair of attached blocks 30 and 31, the lower one of which (30) is of rectangular shape and is mounted upon wheels 21 in the usual manner for rolling movement. Block 31 is also generally rectangular but has a dove-tail slot or groove 32 in its upper surface, and is engaged threadwise with a bolt 34 disposed with its axis parallel to the long dimension of said groove. At one end, said bolt terminates in a hand wheel, and at the other end the bolt is secured to the frame body 28.

The body 28 of the assembly is disposed upright with its lower extremity engaged with the dove-tail groove 32 of base 27. Head frame 29 is pivotally secured to the body at the upper extremity and the body and head are movable with respect to the wheels and base of the assembly in accordance with rotational and axial movement of bolt 34.

The arm 40 is carried by head frame 29, being pivotally attached thereto by means of a pivot pin 41 which extends through a portion of the arm between the ends of said arms and engages the head frame. An electrode 42 is attached to the end of arm 40 which extends beyond the head frame. An adjustable cam 45 engages the opposite end of arm 40 which is bifurcated and disposed within the head frame. The cam is attached to a worm gear which engages a worm or screw portion of the drive shaft of electric motor 46.

Wire 49 connects electrode 42 to a source of electric current (not shown), and wire 50 serves to "ground" the steel slab S to be kerfed, connecting it to a suitable electric current receptacle (not shown).

Use of the device of Figs. 1, 2 and 3 involves bringing the electrode 2 adjacent the slab S in the vicinity of the starting point of the kerfing or cutting course, and establishing an electric arc by closing switch 17. As the metal is severed by the arc, the cutter and attached electrode is urged forward to extend the cut along the desired course, and the cutter is continuously moved up and down as though the electrode were being used to mechanically saw the slab. Direct contact between the slab and electrode, is, of course, to be avoided because the arc will thus be extinguished. When cutting to the desired extent has been accomplished, the arc is suitably extinguished by opening switch 17, or by moving the electrode 2 away from the slab, or both.

In the use of the apparatus of Figs. 4 and 5, the vehicle is disposed with respect to a metal slab or billet to be kerfed so that the electrode 42 will effect the desired kerfing. The circuit for supplying electric current to the electrode and establishing an electric cutting arc, as described above, is closed by manipulation of a switch (not shown), and electric motors 23 and 46 are started. By the resulting action of cam 45, the electrode is oscillated with respect to the slab or billet to be cut, and this cutting proceeds along a predetermined course in accordance with motion of the apparatus with respect to said slab or billet. When cutting has thus been completed the electric circuit is broken and the arc is extinguished.

As indicated in Figs. 4 and 5, the operation may alternatively involve motion of the slab or billet with respect to the apparatus, the slab or billet being carried upon a movable frame having no connection with the cutter assembly or being carried upon a frame over which the metal piece may be readily moved. As a further alternative, the cutter assembly and slab or billet may both be moved as cutting proceeds, the slab suitably being moved generally vertically and the assembly being moved generally horizontally. An arcuate or curved cutting course may thus be followed by the electrode and arc through or over the slab or billet.

Those skilled in the art will appreciate that with respect to the hand cutting tool of this invention, handles of other designs such as those having water-cooling systems, may be employed; and that the electrode may be of other than blade-like shape. Also, it is understood that graphite has theoretical equivalents, so far as the electrodes are concerned. These and other equivalencies and possible modifications of the apparatus described are within the purview of this invention and are contemplated by the appended claims.

Having thus described the present invention so that others skilled in the art may be able to understand and practice the same, I state that what I desire to secure by Letters Patent is defined in what is claimed.

What is claimed is:

1. Apparatus for shaping a metal piece comprising a head, an arm pivoted to the head, an electrode carried by the arm and extending from one end thereof, a cam directly engaging the other end of the arm, and means for rotating the cam to oscillate the arm about its pivot.

2. Apparatus for shaping a metal piece comprising a head, an arm pivoted to the head and having a bifurcated end, an electrode carried by the arm and extending from its other end, cam means disposed in and engaging said bifurcated end of the arm, and means for driving the cam means to oscillate the arm means about its pivot.

3. Apparatus for shaping a metal piece comprising a body, a head pivoted to the body, an arm pivoted to the head, an electrode carried by the arm and extending therefrom, a cam engaging the arm, and means for rotating the cam to oscillate the arm about its pivot.

4. Apparatus for shaping a metal piece comprising a base having wheels, a body carried by the base and slidable relative to the base, a head pivoted to the body, an arm pivoted to the head, an electrode carried by the arm and extending therefrom, a cam engaging the arm, and means for rotating the cam to oscillate the arm about its pivot.

5. Apparatus for shaping a metal piece comprising a two piece body, the lower part of the body being slidable on the base, and the upper part of the body being rotatable relative to said lower part, a head pivoted to the upper part of the body, an arm pivoted to the head, an electrode carried by the arm and extending therefrom, a cam engaging the arm, and means for rotating the cam to oscillate the arm about its pivot.

6. Apparatus for shaping a metal piece comprising a base having wheels and a threaded aperture, a body slidably engaged with the base and extending upwardly therefrom, a head pivoted to the upper portion of the body, an arm pivoted to the head, an electrode carried by the arm and extending therefrom, means including a bolt screwed through the threaded aperture of the base and secured to the body for moving the body relative to the base to a predetermined position, and means for oscillating the arm and the electrode including a cam engaging the arm and a motor carried by the head to rotate the cam.

CLYDE M. RUTTER.

REFERENCES CITED

The following references are of record in the file of this patent:

UNITED STATES PATENTS

| Number | Name | Date |
|---|---|---|
| 1,029,389 | Metzger | June 11, 1912 |
| 1,298,590 | Smith | Mar. 25, 1919 |
| 1,303,484 | Langdon | May 13, 1919 |
| 1,481,854 | Armstrong | Jan. 29, 1924 |
| 1,580,020 | Cutler et al. | Apr. 6, 1926 |
| 1,667,585 | Chapman | Apr. 24, 1928 |
| 1,719,112 | Holslag | July 2, 1929 |
| 1,947,300 | Mayoh | Feb. 13, 1934 |
| 1,952,505 | Landis | Mar. 27, 1934 |
| 2,059,236 | Holslag | Nov. 3, 1936 |
| 2,125,172 | Kinzel | July 26, 1938 |
| 2,346,975 | Laboulais | Apr. 18, 1944 |
| 2,350,614 | Jackson | June 6, 1944 |
| 2,352,939 | Cockrill et al. | July 4, 1944 |
| 2,397,519 | Anthony | Apr. 2, 1946 |